(12) United States Patent
Rhyne et al.

(10) Patent No.: US 7,650,919 B2
(45) Date of Patent: *Jan. 26, 2010

(54) NON-PNEUMATIC TIRE HAVING WEB SPOKES

(75) Inventors: Timothy B. Rhyne, Greenville, SC (US); Ronald H. Thompson, Greenville, SC (US); Steven M. Cron, Simpsonville, SC (US); Kenneth W. Demino, Anderson, SC (US)

(73) Assignee: Michelin Recherche of Technique S.A., Granges-Paccot (CH)

( * ) Notice: Subject to any disclaimer, the term of this patent is extended or adjusted under 35 U.S.C. 154(b) by 291 days.

This patent is subject to a terminal disclaimer.

(21) Appl. No.: 11/697,938

(22) Filed: Apr. 9, 2007

(65) Prior Publication Data

US 2007/0267116 A1 Nov. 22, 2007

Related U.S. Application Data

(63) Continuation-in-part of application No. 10/782,999, filed on Feb. 20, 2004, now Pat. No. 7,201,194, which is a continuation-in-part of application No. 10/081,571, filed on Feb. 22, 2002, now Pat. No. 6,769,465, which is a continuation of application No. PCT/US99/29366, filed on Dec. 10, 1999.

(51) Int. Cl.
*B60B 9/26* (2006.01)

(52) U.S. Cl. .............................. 152/246; 152/5; 152/11; 152/270

(58) Field of Classification Search ...................... 152/5, 152/7, 12, 69, 80, 246, 253, 256, 258, 259, 152/267, 270, 273, 275–277, 280
See application file for complete search history.

(56) References Cited

U.S. PATENT DOCUMENTS 811,232 A 1/1906 Lang et al.

(Continued)

FOREIGN PATENT DOCUMENTS

EP 0 159 888 B1 3/1991
JP 1-311902 12/1989

OTHER PUBLICATIONS

International Search Report (mailing date Apr. 23, 2002) for PCT/US01/26379 filed Aug. 24, 2001.

*Primary Examiner*—Russell D Stormer
(74) *Attorney, Agent, or Firm*—E. Martin Remick; Frank J Campigotto; Kurt J Fugman

(57) ABSTRACT

A structurally supported tire includes a ground contacting tread portion, a reinforced annular band disposed radially inward of the tread portion, and a plurality of web spokes extending transversely across and radially inward from the reinforced annular band and anchored in a wheel or hub. The reinforced annular band comprises an elastomeric shear layer, at least a first membrane adhered to the radially inward extent of the elastomeric shear layer and at least a second membrane adhered to the radially outward extent of the elastomeric shear layer. Each of the membranes has a longitudinal tensile modulus sufficiently greater than the shear modulus of the shear layer, and a longitudinal compression modulus of a second membrane is at least equal to the longitudinal tensile modulus of a first membrane so that when under load the ground contacting portion of the tire deforms to a flat contact region through shear strain in the shear layer while maintaining constant the length of the membranes. The web spokes transmit load forces between the annular band and the hub through tension in the web spokes not connected to the ground contacting portion of the tire.

9 Claims, 5 Drawing Sheets

U.S. PATENT DOCUMENTS

| | | |
|---|---|---|
| 1,101,702 A | 6/1914 | Lakoff |
| 1,147,600 A | 7/1915 | Borland |
| 1,268,078 A | 5/1918 | Lambert |
| 1,349,914 A | 8/1920 | Pratt |
| 1,414,543 A | 5/1922 | Bessler |
| 1,414,544 A | 5/1922 | Bessler |
| 1,493,922 A | 5/1924 | Deister |
| 1,494,797 A | 5/1924 | Nimschke |
| 1,502,908 A | 7/1924 | Cozatt |
| 6,769,465 B2 * | 8/2004 | Rhyne et al. ............... 152/197 |
| 6,983,776 B2 * | 1/2006 | Thompson et al. .......... 152/197 |
| 7,201,194 B2 * | 4/2007 | Rhyne et al. ................ 152/5 |

* cited by examiner

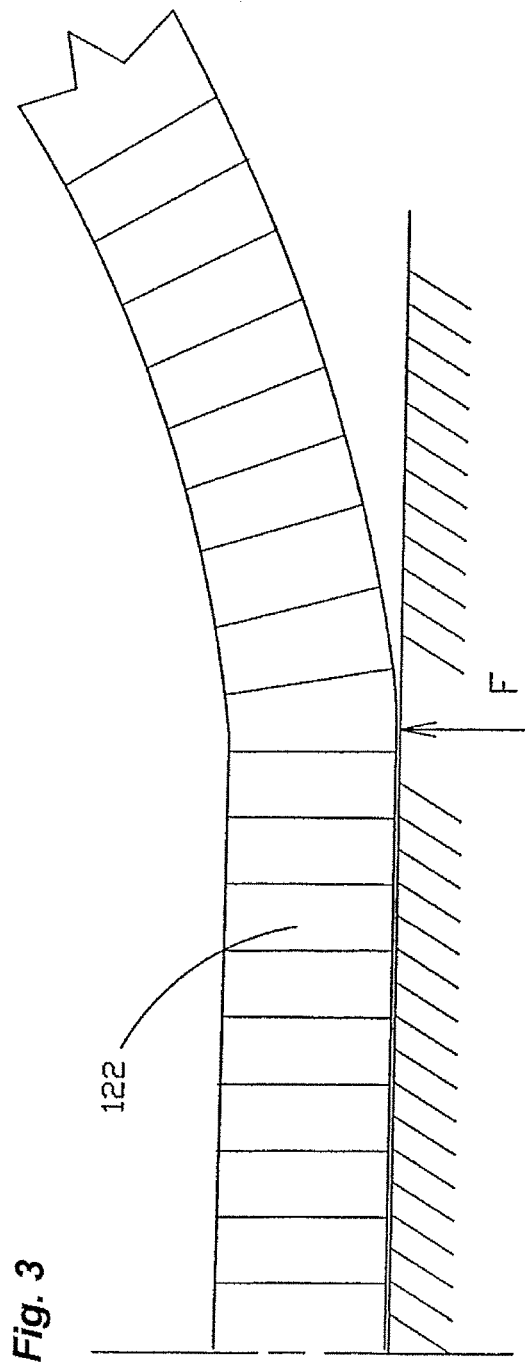
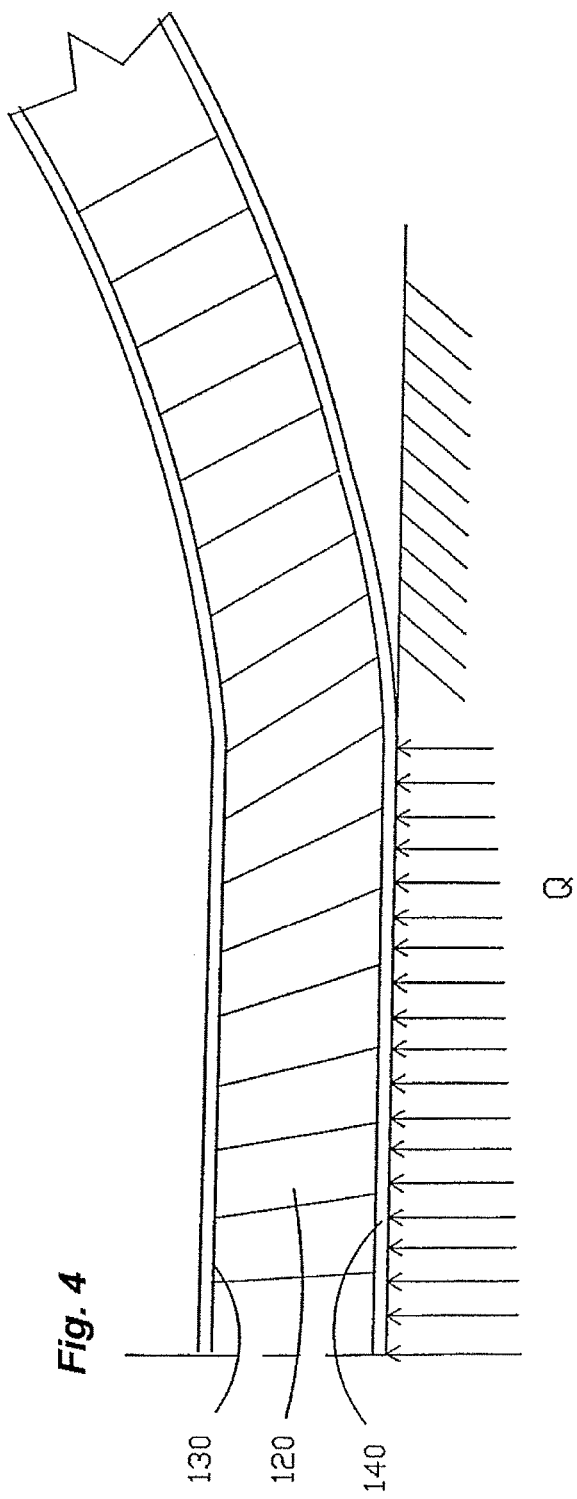

NON-PNEUMATIC TIRE HAVING WEB SPOKES

CROSS-REFERENCE TO PREVIOUSLY FILED APPLICATIONS

This application is a continuation-in-part of U.S. patent application Ser. No. 10/782,999 filed Feb. 20, 2004, now U.S. Pat. No. 7,201,194 issued Apr. 10, 2007 and which is a continuation-in-part of U.S. patent application Ser. No. 10/081,571 filed Feb. 22, 2002, now U.S. Pat. No. 6,769,465 issued Aug. 3, 2004 and which is a continuation of International Application PCT/US99/29366 filed Dec. 10, 1999. The entire disclosures of prior filed U.S. patent application Ser. Nos. 10/081,571 and 10/782,999 are incorporated by reference herein.

BACKGROUND AND SUMMARY OF THE INVENTION

The invention relates to a non-pneumatic, structurally supported tire. More particularly, the invention relates to a non-pneumatic tire that supports a load with its structural components and has pneumatic tire-like performance capabilities to serve as a replacement for pneumatic tires. The pneumatic tire has capabilities in load carrying, road shock absorption, and force transmission (accelerating, stopping, and steering) that make it the preferred choice for use on many vehicles, most notably, bicycles, motorcycles, automobiles, and trucks. Conventional non-pneumatic alternatives rely on compression of the ground-contacting portion for load support, for example, solid tires, spring tires and cushion tires, and lack the performance advantages of pneumatic tires. Accordingly, except in limited situations, known non-pneumatic tires have not found wide use as substitutes for pneumatic tires. A non-pneumatic tire having performance characteristics similar to those of pneumatic tires would overcome the various deficiencies in the art and would be a welcome improvement.

A structurally supported, non-pneumatic tire in accordance with the invention includes a reinforced annular band that supports the load on the tire and a plurality of web spokes that transmit in tension the load forces between the annular band and a wheel or hub.

According to an embodiment useful as a tire on a motor vehicle, a structurally supported tire includes a tread portion, a reinforced annular band radially inward of the tread portion, a plurality of web spokes extending transversely across and radially inward from the annular band toward a tire axis, and means for interconnecting the web spokes to a wheel or hub.

The structurally supported tire of the invention does not have a cavity for containing air under pressure, and accordingly, does not need to form a seal with the wheel rim to retain internal air pressure. The structurally supported tire does not, therefore, require a wheel as understood in the pneumatic tire art. For the purposes of the following description, the terms "wheel" and "hub" refer to any device or structure for supporting the tire and mounting to the vehicle axle, and are considered interchangeable herein.

The annular band comprises an elastomeric shear layer, at least a first membrane adhered to the radially inward extent of the elastomeric shear layer, and at least a second membrane adhered to the radially outward extent of the elastomeric shear layer. Each of the membranes has a longitudinal tensile modulus greater than the shear modulus of the shear layer, a ratio of a longitudinal tensile modulus of one of the membranes to the shear modulus of the shear layer is at least about 100:1, and a longitudinal compression modulus of the second membrane is at least equal to the longitudinal tensile modulus of the first membrane such that, under an externally applied load, the ground contacting tread portion deforms from essentially a circular shape to a shape conforming with the ground surface while maintaining an essentially constant length of the membranes. Relative displacement of the membranes occurs by shear in the shear layer. Preferably, the membranes comprise superposed layers of essentially inextensible cord reinforcements embedded in an elastomeric coating layer.

The annular band may further comprise an intermediate layer located within the shear layer and radially outward of the first membrane and radially inward of the second membrane. In a particular design example, the intermediate layer comprises cord reinforcements having a volume fraction between about 0.005 and 0.010, and the cord reinforcements may be oriented parallel to the tire circumferential direction.

The elastomeric shear layer is formed of a material, such as natural or synthetic rubber, polyurethane, foamed rubber and foamed polyurethane, segmented copolyesters and block co-polymers of nylon. Preferably, the shear layer material has a shear modulus of about 3 MPa to about 20 MPa. The annular band has the ability to bend from a normal circular shape while under load to conform to a contact surface, such as a road surface.

The web spokes act in tension to transmit load forces between the wheel and the annular band, thus, among other functions, supporting the mass of a vehicle. Support forces are generated by tension in the web spokes not connected to the ground-contacting portion of the annular band. The wheel or hub can be said to hang from the upper portion of the tire. Preferably, the web spokes have a high effective radial stiffness in tension and a low effective radial stiffness in compression. The low stiffness in compression allows the web spokes attached to the ground-contacting portion of the annular band to bend for absorbing road shocks and for better conforming the annular band to the irregularities in the road surface.

To facilitate the bending of the web spokes of the ground contacting portion of the tread, the spokes can be curved. Alternatively, the web spokes can be pre-stressed during molding to bend in a particular direction.

BRIEF DESCRIPTION OF THE DRAWINGS

The invention will be better understood through reference to the following description and the appended drawings, in which:

FIG. 3 is a schematic diagram illustrating the ground reaction forces for a reference homogeneous band not exhibiting shear deformation;

FIG. 4 is a schematic diagram illustrating the ground reaction forces for an annular band in accordance with the invention;

DETAILED DESCRIPTION OF THE INVENTION

The following terms are defined as follows for this description:

"Equatorial Plane" means a plane that passes perpendicular to the tire axis of rotation and bisects the tire structure.

"Meridian Plane" means a plane that passes through and includes the axis of rotation of the tire.

"Modulus" of elastomeric materials means the tensile modulus of elasticity at 10% elongation measured per ASTM Standard Test Method D412.

"Tensile Modulus" of the membranes means the tensile modulus of elasticity at 1% elongation in the circumferential direction multiplied by the effective thickness of the membrane. This tensile modulus can be calculated by Equation 1, below, for conventional tire steel belt materials. This modulus is noted with a prime (') designation.

"Compression Modulus" of the membranes as used here for a cord reinforced membrane is determined by molding a test specimen that is 30 mm deep, 24 mm wide, and 40 mm long. The test specimen is constructed with the subject cords or other reinforcing elements contained in the rubber and/or other materials that will be used to construct the ply. The cords are oriented along the length of the test specimen (the 40 mm dimension) and are aligned in a single plane, parallel to one another. The pace used for the cords is the same as that to be used in the ply. Using an Instron 4466, the relationship of force and compressive load is measured for the specimen. The same relationship is then determined for a sample having the same dimension but constructed without the cords or reinforcing elements—i.e. only containing the isotropic rubber and/or other materials. The difference in stiffness between the two samples is then used to determine the compressive modulus for the cords (also referred to as "cables"). This modulus is also noted with a prime (') designation.

"Shear Modulus" of elastomeric materials means the shear modulus of elasticity and is defined equivalent to one-third the tensile modulus of elasticity as defined above for elastomeric materials.

"Hysteresis" means the dynamic loss tangent (tan Δ) measured at operating strain, temperature, and frequency. One of ordinary skill in the art will understand that the operating conditions differ for particular applications, for example, the different load and speed requirements for golf carts and sports cars, and that the strain, temperature, and frequency are to be specified for the particular application.

Figure 1:
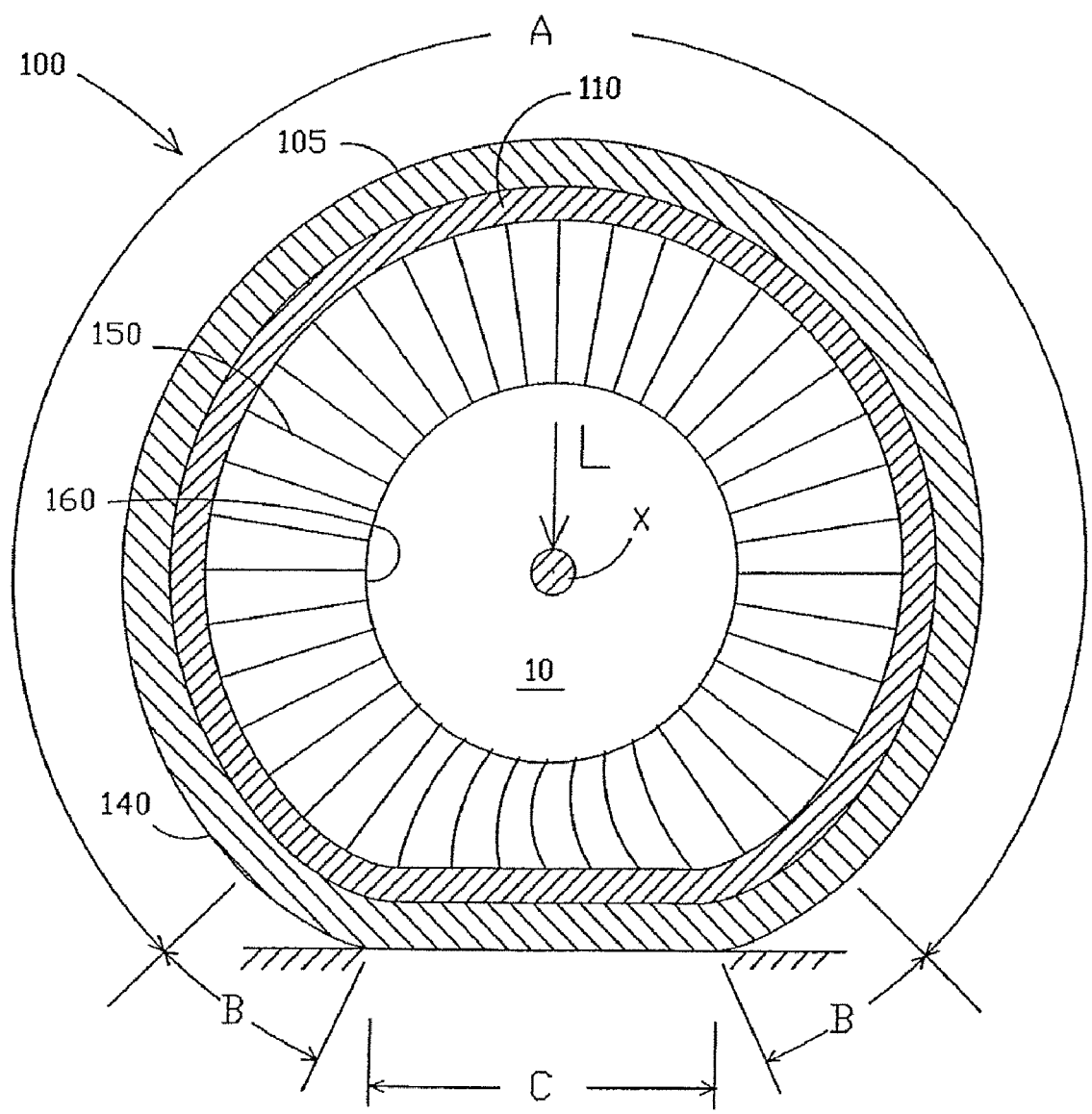
FIG. 1 is a schematic view in the equatorial plane of a tire of the invention under load.

A structurally supported resilient tire in accordance with the invention is shown in schematic view in FIG. 1 in the equatorial plane. Structurally supported means that the tire carries a load by its structural components without the support of gas inflation pressure. The structures disclosed for the several variations of a structurally supported resilient tire utilize similar basic components. Reference numerals depicted in the drawings follow a consistent pattern for each variation. The figures are not drawn to scale, and the dimensions of elements have been exaggerated or reduced for clarity of the illustration.

Figure 7:
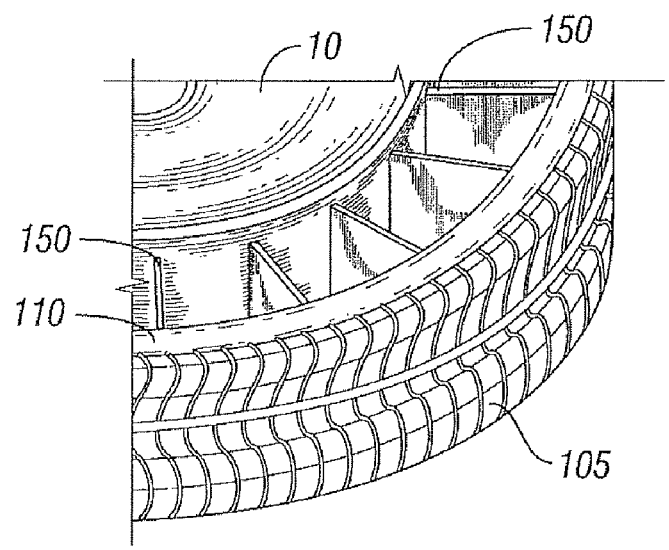
FIG. 7 is a perspective view of a portion of an exemplary embodiment of a tire in accordance with the present invention.

The tire 100 shown in FIG. 1 has a ground contacting tread portion 105, a reinforced annular band 110 disposed radially inward of the tread portion, a plurality of web spokes 150 extending transversely across and radially inward from the annular band, and a mounting band 160 at the radially inner end of the web spokes. The mounting band 160 anchors the tire 100 to a wheel 10 or hub. As used herein "extending transversely" means that the web spokes 150 may be axially aligned, or may be oblique to the tire axis. Further, "extending radially inward" means that the web spokes 150 may lie in a plane radial to the tire axis or may be oblique to the radial plane. In addition, as explained below, a second plurality of web spokes may extend in the equatorial plane. FIG. 7 is a perspective view of a portion of an exemplary embodiment of a tire in accordance with the present invention showing the web spokes 150 extending substantially transversely across and radially inward from the reinforced annular band 110.

Figure 2:
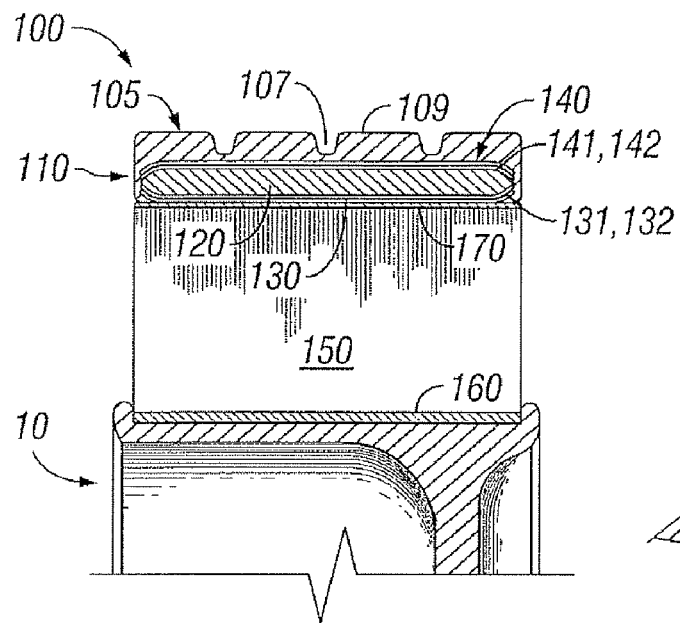
FIG. 2 is a section view of a tire in accordance with the invention taken in the meridian plane.

Referring to FIG. 2, which shows the tire 100 and wheel 10 in section view in the meridian plane, the reinforced annular band 110 comprises an elastomeric shear layer 120, a first membrane 130 adhered to the radially innermost extent of the elastomeric shear layer 120, and a second membrane 140 adhered to the radially outermost extent of the elastomeric shear layer 120. The membranes 130 and 140 have a tensile stiffness that is greater than the shear stiffness of the shear layer 120 so that the reinforced annular band 110 undergoes shear deformation under load.

The reinforced annular band 110 supports loads on the tire. As indicated in FIG. 1, a load L placed on the tire axis of rotation X is transmitted by tension in the web spokes 150 to the annular band 110. The annular band 110 acts in a manner similar to an arch and provides a circumferential compression stiffness and a longitudinal bending stiffness in the tire equatorial plane sufficiently high to act as a load-supporting member. Under load, the annular band deforms in contact area C with the ground surface through a mechanism including shear deformation of the band. The ability to deform with shear provides a compliant ground contact area C that acts similar to that of a pneumatic tire, with similar advantageous results.

Referring to FIGS. 3 and 4, the advantage of the shear mechanism of the annular band 110 of the invention may be understood by comparison to a rigid annular band 122 comprised of a homogeneous material, for example, a metallic ring, that does not allow for more than insignificant shear deformation under load. In the rigid annular band 122 of FIG. 3, the pressure distribution satisfying the equilibrium force and bending moment requirements is made up of a pair of concentrated forces F located at each end of the contact area, one end of which is shown in FIG. 3. By contrast, if the annular band comprises a structure in accordance with the invention as shown in FIG. 4 of shear layer 120, inner reinforcement 130, and outer reinforcement 140, which prescribes shear deformation, the resulting pressure distribution S on the contact region is substantially uniform.

The beneficial result of the annular band in accordance with the invention is a more uniform ground contact pressure S throughout the length of the contact area, which is similar to a pneumatic tire and improves the tire function over other non-pneumatic tires.

In typical solid and cushion tires, the load is supported by compression of the tire structure in the contact area, and load capacity is limited by the amount and type of material present in the contact area. In certain types of spring tires, a rigid outer ring supports the load on the tire and is connected to the hub or wheel by resilient spring members. However, a rigid ring does not have a shear mechanism, and thus, as explained above, a rigid ring has concentrated ground reaction forces at the ends of the contact area, which affects the ability of the tire to transmit forces to the ground and to absorb ground shocks.

The shear layer 120 comprises a layer of elastomeric material having a shear modulus of about 3 MPa to about 20 MPa. Materials believed to be suitable for use in the shear layer 120 include natural and synthetic rubbers, polyurethanes, foamed rubbers and polyurethanes, segmented copolyesters, and block co-polymers of nylon. Repeated deformation of the shear layer 120 during rolling under load causes hysteretic losses leading to heat buildup in the tire. Thus, hysteresis of the shear layer should be specified to maintain an operating temperature below the allowable operating temperature for the materials used. For conventional tire materials (e.g., rubber), for example, the hysteresis of the shear layer should be specified to generate a temperature below about 130° C. for tires in continuous use.

The tread portion 105 may have no grooves or may have a plurality of longitudinally oriented tread grooves 107 forming essentially longitudinal tread ribs 109 therebetween, as in the illustrative example of FIG. 2. In addition, the tread 105 is shown as being flat from edge to edge. This will be suitable for automobiles and other similar vehicle, but rounded treads may be used for bicycles, motorcycles and other two-wheeled vehicles. Any suitable tread sculpture may be used as is known to those of skill in the art.

According to a preferred embodiment, the first 130 and second 140 membranes comprise essentially inextensible cord reinforcements embedded in an elastomeric coating. For a tire constructed of elastomeric materials, membranes 130 and 140 are adhered to the shear layer 120 by the cured elastomeric materials. It is within the scope of the invention for membranes 130 and 140 to be adhered to the shear layer 120 by any suitable method of chemical or adhesive bonding or mechanical fixation.

The reinforcing elements in the membranes 130, 140 may be any of several materials suitable for use as tire belt reinforcements in conventional tires such as monofilaments or cords of steel, aramid, or other high modulus textiles. For the illustrative tires described herein, the reinforcements are steel cords, each consisting of four wires of 0.28 mm diameter (4×0.28).

According to a preferred embodiment, the first membrane includes two reinforced layers 131 and 132 and the second membrane 140 also includes two reinforced layers 141 and 142.

Although the variations of the invention disclosed herein have cord reinforced layers for each of the membranes, any suitable material may be employed for the membranes which meets the requirements, described below, for the tensile stiffness, bending stiffness, and compressive buckling resistance properties required of the annular band. That is to say, the membrane structure may be any of several alternatives such as a homogeneous material (e.g., thin metal sheet), a fiber reinforced matrix, or a layer having discrete reinforcing elements.

In a first preferred embodiment, the first membrane 130 layers 131 and 132 have essentially parallel cords oriented at an angle of about 10° to about 45° relative to the tire equatorial plane. The cords of the respective layers have an opposite orientation. Similarly for the second membrane 140, layers 141 and 142 have essentially parallel cords oriented at angles between 10 and 45 relative to the equatorial plane. It is not required, however, for the cords of the layer pairs in a membrane to be oriented at mutually equal and opposite angles. For example, it may be desirable for the cords of the layer pairs to be asymmetric relative to the tire equatorial plane.

According to another embodiment, the cords of at least one layer of the membranes can be at or near 0° to the equatorial plane for increased tensile stiffness of the membrane.

The cords of each of the layers 131, 132 and 141, 142 are embedded in an elastomeric coating layer typically having a shear modulus of about 3 to 20 MPa. It is preferred that the shear modulus of the coating layers be substantially equal to the shear modulus of the shear layer 120 to insure that deformation of the annular band is primarily by shear deformation within shear layer 120.

The relationship between the shear modulus G of the elastomeric shear layer 120 and the effective longitudinal tensile modulus $E'_{membrane}$ of the membranes 130 and 140 controls the deformation of the annular band under an applied load. The effective tensile modulus $E'_{membrane}$ of the membrane using conventional tire belt materials and with membrane reinforcing cords oriented to at least 10° to the equatorial plane can be estimated by the following:

$$E'_{MEMBRANE} = (2D+t)\frac{E_{RUBBER}}{2(1-v^2)}\left[\left(\frac{P}{P-D}\right)\frac{2-(1+v)SIN^2(2\alpha)}{SIN^4\alpha} + \left(\frac{t}{D}\right)\frac{1}{TAN^2\alpha}\left(\frac{1}{TAN^2\alpha}-v\right)\right] \quad (1)$$

Where, $E_{rubber}$=Tensile modulus of the elastomeric coating material; P=Cord pace (cord centerline spacing) measured perpendicular to the cord direction; D=Cord diameter; v=Poisson's ratio for the elastomeric coating material; α=Cord angle with respect to the equatorial plan; and, t=Rubber thickness between cables in adjacent layers.

For a shear layer membrane in which the reinforcing cords are oriented at less than 10° to the equatorial plane, the following can be used to estimate the tensile modulus of the membrane $E'_{membrane}$:

$$E'_{membrane}=E_{cable}*V*t_{membrane} \quad (2)$$

where, $E_{cable}$ is the modulus of the cable, V is the volume fraction of the cable in the membrane, and $t_{membrane}$ is the thickness of the membrane.

For membranes comprising a homogeneous material or a fiber or other material reinforced matrix, the modulus is the modulus of the material or matrix.

Note that $E'_{membrane}$ is the elastic modulus of the membrane times the effective thickness of the membrane. When the ratio $E'_{membrane}/G$ is relatively low, deformation of the annular band under load approximates that of the homogeneous band and produces a non-uniform ground contact pressure as shown in FIG. 3. On the other hand, when the ratio $E'_{membrane}/G$ is sufficiently high, deformation of the annular band under load is essentially by shear deformation of the shear layer with little longitudinal extension or compression of the membranes. Accordingly, ground contact pressure is substantially uniform as in the example shown in FIG. 4.

According to the invention, the ratio of the longitudinal tensile modulus of the membrane $E'_{membrane}$ to the shear modulus G of the shear layer is at least about 100:1, and preferably at least about 1000:1.

The tire shown in FIG. 2 has a flat transverse profile for the tread portion 105, first membrane 130 and second membrane 140. The strains in the portion of the annular band in the contact region C (FIG. 1) will be compressive for the second membrane 140. As the vertical deflection of the tire increases, the contact length can increase such that the compressive stress in second membrane 140 exceeds the critical buckling stress, and a longitudinal buckling of the membrane occurs. This buckling phenomenon causes a longitudinally extending section of the contact region to have reduced contact pressure. A more uniform ground contact pressure throughout the length of the ground contacting region is obtained when buckling of the membrane is avoided.

It has been determined that for the reinforcements typically used in tires and available for use to reinforce the membranes will produce a result where the compression modulus of the membrane is lower than the tensile modulus of the membrane. When the first membrane 130 and the second membrane 140 are constructed from the same or similar arrangements of cord reinforcements, the compression modulus of the membrane measured in the longitudinal direction may have a value from one-sixth to one-third lower of the tensile modulus of the membrane measured in the longitudinal direction. Therefore, to reduce the tendency of the second membrane 140 to undergo buckling, it has been determined that the longitudinal compression modulus of the second membrane 140 is at least equal to the longitudinal tensile modulus of the first membrane 130. The correct amount of reinforcement needed to achieve the compression modulus may be determined using samples produced and measured according to the procedure defined above.

When the previously stated conditions for longitudinal tensile modulus $E'_{membrane}$ of the membranes and the shear modulus G of the shear layer are met and the annular band deforms substantially by shear in the shear layer, an advantageous relation is created allowing one to specify the values of shear modulus G and shear layer thickness h for a given application:

$$P_{eff} * R \approx G * h \quad (3)$$

Where, $P_{eff}$=Ground contact pressure; G=Shear modulus of layer 120; h=Thickness of layer 120; and R=Radial position of the second membrane relative to the axis of rotation.

$P_{eff}$ and R are design parameters chosen according to the intended use of the tire. Equation 3 suggests that the product of the shear modulus of elasticity of the shear layer times a radial thickness of the shear layer is approximately equal to a product of ground contact pressure times a radial position of the outermost extent of the second membrane.

Referring to FIG. 7, the web spokes 150 are substantially sheet-like elements having a length N in the radial direction, a width W in the axial direction corresponding generally to the axial width of the annular band 110, and a thickness perpendicular to the other dimensions. The thickness is much less than either the length N or the width W, and is preferably about 1% to 5% of the radius R of the tire, which allows a web spoke to buckle when under compression, as shown in FIG. 1. Thinner web spokes will bend in the contact area with substantially no compressive resistance, that is, without supplying more than an insignificant compressive force to load bearing. As the thickness of the web spokes increases, the web spokes may provide some compressive load bearing force in the ground contact area. The predominant load transmitting action of the web spokes as a whole, however, is tension. The particular web spoke thickness may be selected to meet the specific requirements of the vehicle.

According to a presently preferred embodiment, the web spokes 150 are formed of a material having high tensile modulus of about 10 to 100 MPa. The web spokes may be reinforced if desired. The web spoke material should also exhibit elastic behavior to return to original length after being strained to 30%, and to exhibit constant stress when the web spoke material is strained to 4%. Further, it is desirable to have a material with a tan Δ of not more than 0.1 at the relevant operating conditions. For example, commercially available rubber or polyurethane materials can be identified which meet these requirements. The inventors have found that Vibrathane B836 brand urethane from the Uniroyal Chemical division of Crompton Corporation of Middlebury, Conn. has been suitable for the web spokes.

Referring to FIG. 2, in one embodiment, the web spokes 150 are interconnected by a radially inner mounting band 160, which encircles the wheel or hub 10 to mount the tire. An interface band 170 interconnects the web spokes 150 at their radially outer ends. The interface band 170 connects the web spokes 150 to the annular band 110. For convenience, the web spokes, the mounting band 160, and the interface band 170 may be molded from a single material as a unit.

Figure 8:
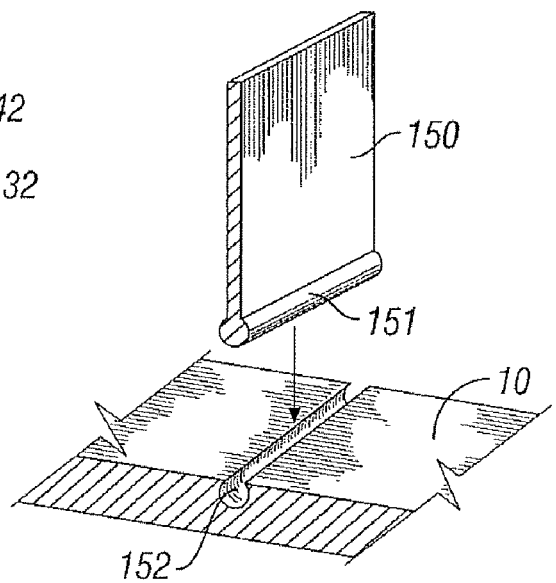
FIG. 8 is a perspective view of a portion of a web spoke having an enlarged end portion for fitting into an engaging slot in a wheel.

Alternatively, depending on the construction materials and process for the annular band 110 and hub or wheel 10, a separate mounting band 160 or interface band 170 may be eliminated and the web spokes molded or formed to directly adhere to the annular band and wheel. For example, if either of the annular band or the wheel or hub is formed with the same or compatible materials, the tire could be manufactured with one step forming or molding the web spokes integrally with the annular band or wheel, in which case, the mounting band 160 and/or interface band 170 are integrally formed as part of the wheel or annular band. Further, the web spokes 150 could be mechanically attached to the wheel, for example, by providing an enlarged portion 151 on the inner end of each web spoke that engages a slot 152 in the wheel 10 as shown in FIG. 8.

Advantageously, the starting design parameters for any proposed application can be selected by choosing the contact pressure, vertical load, and contact area.

For example, to design a tire intended for passenger car use, the designer may select a design contact pressure $P_{eff}$ of 1.5 to 2.5 DaN/cm² and a tire size in which the radius R is about 335 mm. By multiplying these values, a "shear layer factor" of 50.25 to 83.75 DaN/cm may be determined, which can be used to specify the shear layer material thickness and shear modulus. In this case, with a shear modulus in the range of about 3 MPa to about 10 MPa, the thickness h of the shear layer is at least 5 mm and preferably is between about 10 mm to about 20 mm.

Figure 5:
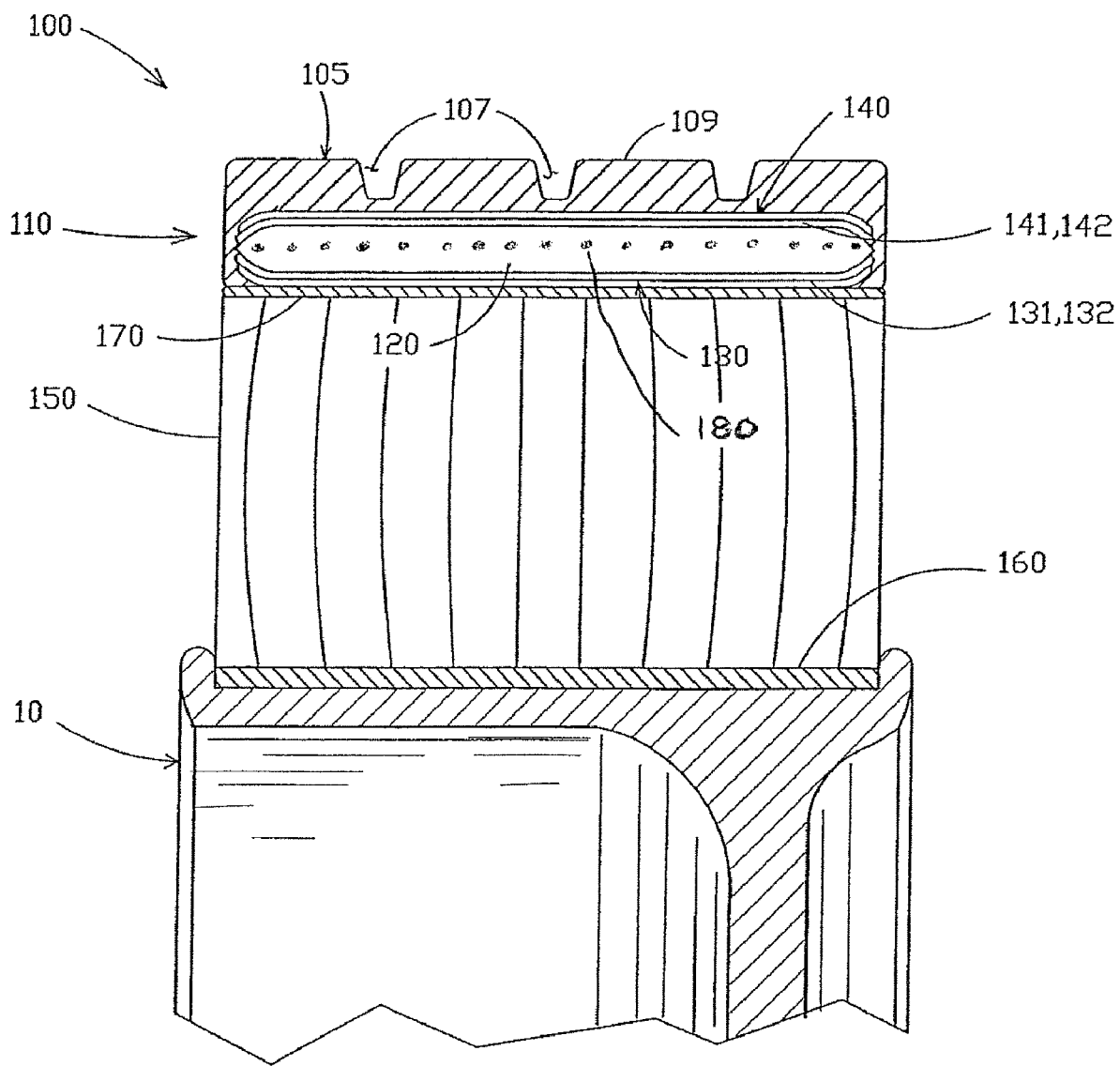
FIG. 5 is a section view of an alternative embodiment of a tire of the invention taken in the meridian plane.
Figure 6:
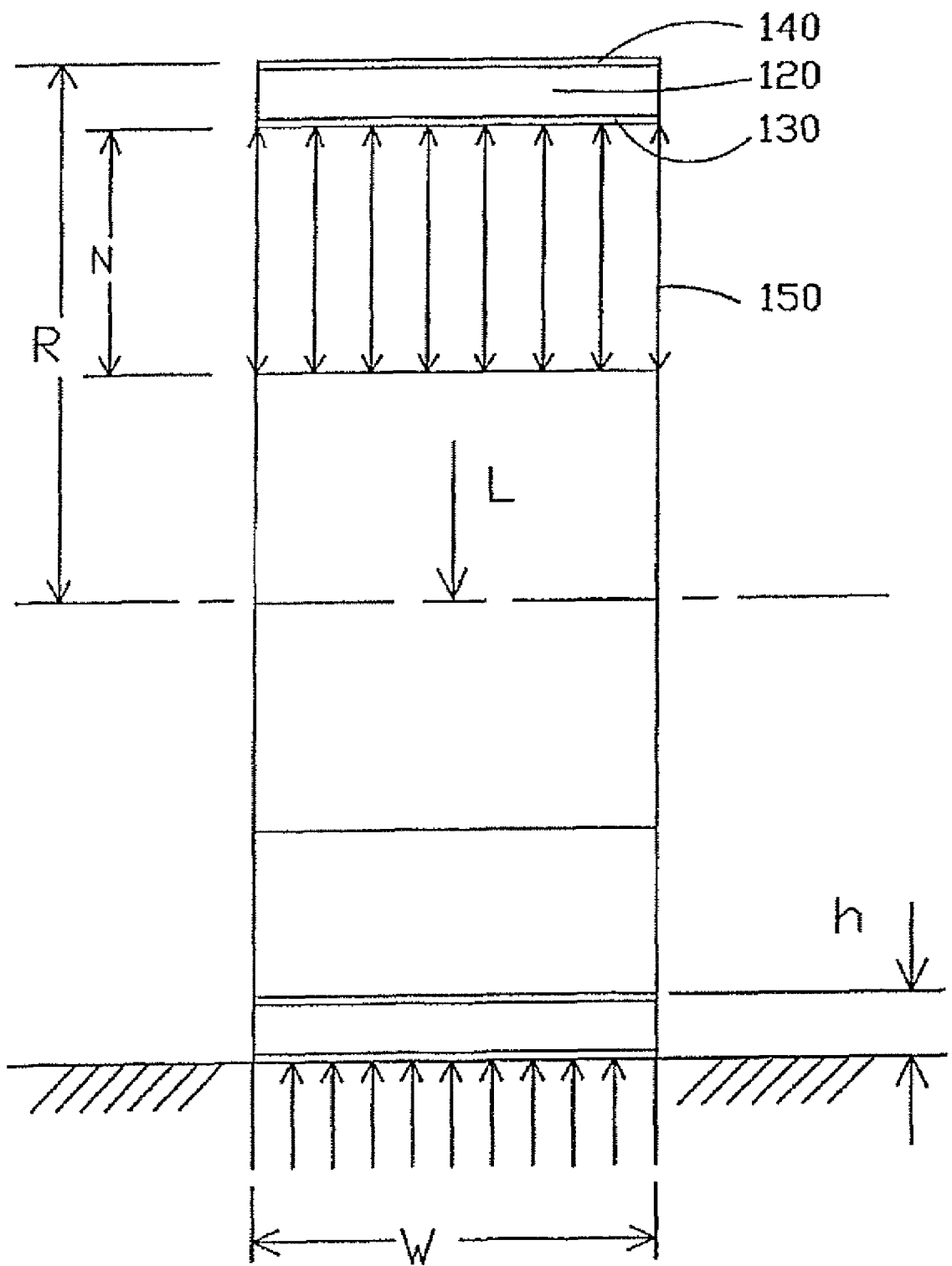
FIG. 6 is a schematic view in the meridian plane of a loaded tire of the invention showing certain reference dimensions to describe the load carrying mechanism.

In another example, to design a larger tire intended for heavy load use such as utility or construction applications, the designer may select a design contact pressure $P_{eff}$ of 3.0 to 5.0 DaN/cm² and a tire size in which the radius R is about 420 mm. In this design example, with a specified shear modulus of about 5 MPa, the thickness h of the shear layer is about 30 mm. It has been determined that when the shear layer become thick, as in this example, that manufacture of the tire and its performance are both improved by the addition of an intermediate layer located radially outward of the first membrane 130 and radially inward of said second membrane 140 and within the thickness of the shear layer 120. FIG. 5 illustrates an example of this construction where the tire has an intermediate layer 180 located at a radial position mid-way between the first membrane 130 and the second membrane 140. In this example, the intermediate reinforcement layer 180 comprises steel cord reinforcements oriented parallel to the tire circumferential direction. The steel cords are selected from any material suitable for tire reinforcements, and, in this example, have a cable construction of nine wires of 0.35 mm diameter (9×0.35).

The intermediate reinforcement layer 180 should have a minimum effect on the shear behavior of the shear layer. That is to say, the layer 180 is not intended to function as a third membrane. This result will be achieved when the cords have a volume fraction with respect to the volume of the shear layer between about 0.005 to about 0.010. That is to say, in a cross-section view of the tire, the volume fraction is estimated by the area of the cables in layer 180 divided by the area of the shear layer 120. In this manner, the shear properties of the shear layer are relatively unchanged from the properties of a homogeneous shear layer. For this particular example, an arrangement of 9×0.35 steel cords spaced axially at about 3 mm to about 6 mm provides an acceptable volume fraction.

Applicants understand that many other variations are apparent to one of ordinary skill in the art from a reading of the above specification. These variations and other variations are within the spirit and scope of the instant invention as defined by the following appended claims.

What is claimed is:

1. A structurally supported tire comprising:
a reinforced annular band comprising an elastomeric shear layer, at least a first membrane adhered to a radially inward extent of the elastomeric shear layer and at least a second membrane adhered to a radially outward extent of the elastomeric shear layer, a tread portion disposed on a radially outer extent of the reinforced annular band
a plurality of web spokes extending transversely across and radially inward from the reinforced annular band; and means for interconnecting the plurality of web spokes with a wheel;
wherein, each of the membranes has a longitudinal tensile modulus greater than the shear modulus of the shear layer, a ratio of a longitudinal tensile modulus of one of the membranes to the shear modulus of the shear layer is at least about 100:1, and a longitudinal compression modulus of said second membrane is at least equal to the longitudinal tensile modulus of said first membrane.

2. The tire according to claim 1, further comprising an intermediate layer located within said shear layer and radially outward of said first membrane and radially inward of said second membrane.

3. The tire according to claim 2, wherein said intermediate layer comprises cord reinforcements having a volume fraction with respect to the volume of said shear layer between about 0.005 and 0.010.

4. The tire according to claim 2, wherein said cord reinforcements of said intermediate layer are oriented parallel to the tire circumferential direction.

5. The tire according to claim 1, wherein each of the at least first and second membranes are formed of one of a homogeneous material, a fiber reinforced matrix, a layer having discrete reinforcing elements, and essentially inextensible cord reinforcements embedded in an elastomer having a shear modulus of elasticity at least equal to the shear modulus of elasticity of the shear layer.

6. The tire according to claim 5, wherein said cord reinforcements of said first and second membranes are oriented parallel to the tire circumferential direction.

7. The tire according to claim 5, wherein said cord reinforcements form an angle with the tire circumferential direction of between about 10° and 45°.

8. The tire according to claim 1, wherein the ratio of the longitudinal tensile modulus of one of the membranes to the shear modulus of the shear layer is at least about 1000:1.

9. The tire according to claim 1, wherein the elastomeric shear layer has a shear modulus of elasticity of about 3 MPa to about 20 MPa.

* * * * *